United States Patent Office 3,849,451
Patented Nov. 19, 1974

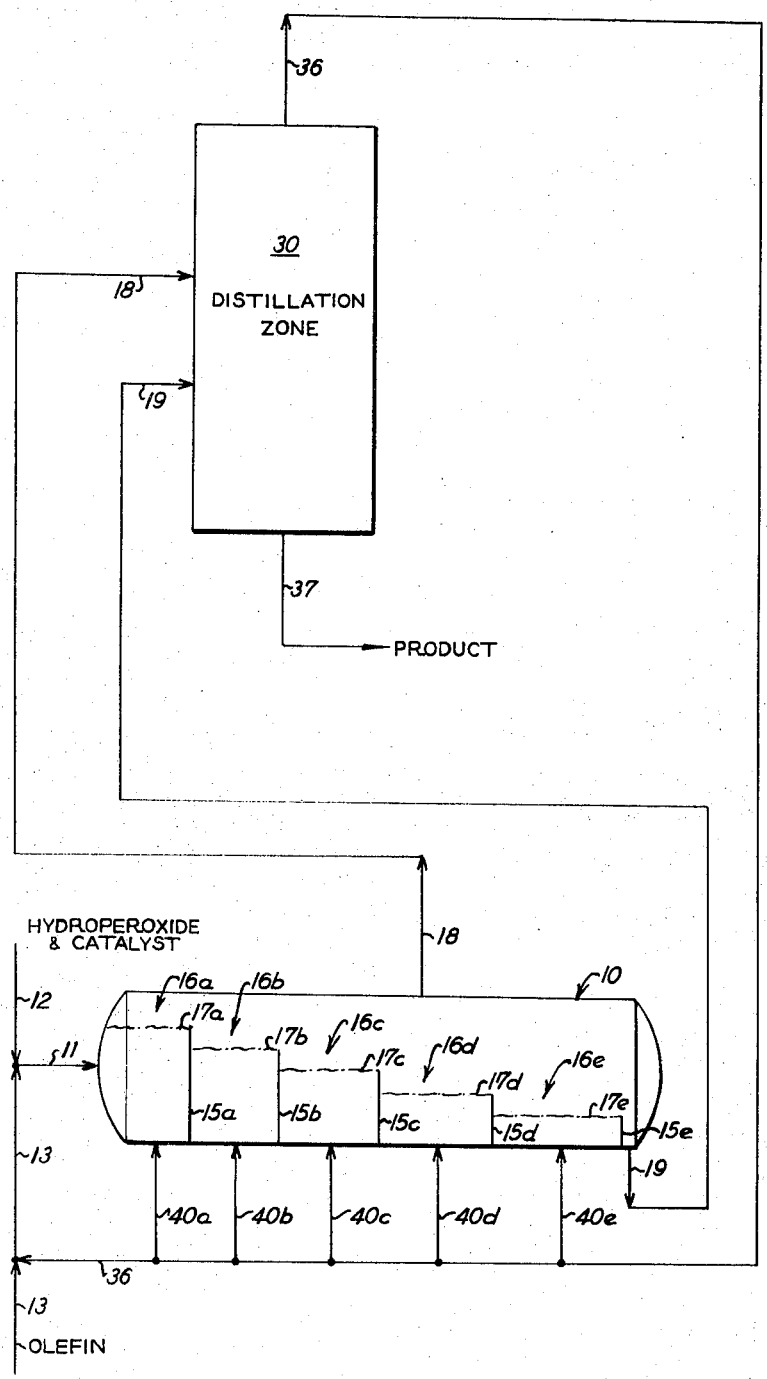

3,849,451
EPOXIDATION PROCESS
Theodore W. Stein, Hastings-on-the-Hudson, Harold Gilman, Milwood, and Richard L. Bobeck, East Northport, N.Y., assignors to Halcon International, Inc.
Continuation of abandoned application Ser. No. 51,332, June 30, 1970. This application Dec. 4, 1972, Ser. No. 311,608
Int. Cl. C07d 1/08
U.S. Cl. 260—348.5 L                3 Claims

ABSTRACT OF THE DISCLOSURE

This invention relates to an improvement in the catalytic epoxidation of olefinically unsaturated organic compounds employing organic hydroperoxides as the epoxidizing agents whereby oxirane derivatives, i.e., epoxides, corresponding to the olefinic starting material, are produced. More specifically, this invention relates to improvements in such a process whereby reaction temperature is closely controlled and in a preferred embodiment, undesired side reactions are minimized.

BACKGROUND

In recently issued Belgian patents, Nos. 663,859, 665,082 and 644,090, there is disclosed a process for the epoxidation of olefins in the presence of catalytically effective amounts of metals. The process disclosed in these Belgian patents is capable of producing epoxides from the olefinic starting materials in high yields, i.e., with only small amounts of undesired side products. The catalysts are one or more metals selected from the group consisting of titanium, vanadium, chromium, columbium, selenium, zirconium, niobium, molybdenum, tellurium, tantalum, tungsten, rhenium and uranium. Of the foregoing, vanadium, tungsten, molybdenum, titanium and selenium are the preferred species. The catalyst metals can be employed in conjunction with alkaline (or basic) substances such as alkali metal compounds or alkaline earth metal compounds.

This is a continuation of application Ser. No. 51,332 filed June 30, 1970, and now abandoned.

The catalyst metals are preferably supplied to the reaction either in the finely divided metallic state or in the form of their compounds. Organo-metallic compounds of the above metals in such forms as, for example, naphthenates, stearates, octanoates, chelates, association compounds and enol salts (e.g. as acetoacetonates) as well as in the form of alkoxy compounds, are useful. Inorganic forms such as, for example, the oxides (e.g., in the case of molybdenum, $Mo_2O_3$, $MoO_2$ and $MoO_3$) acids (e.g., molybdic acid) chlorides, oxychlorides, fluorides, bromides, phosphates, sulfides, heteropoly acids (e.g., phosphomolybdic acid and alkali metal salts thereof) and the like are also useful. Effective amounts of these catalysts desirably are sufficient to provide at least 0.00001 mcl of metal per mol of organic hydroperoxide present in the reaction. Amounts of metal as great as 0.1 mol per mol of organic hydroperoxide or even more can be employed.

As disclosed in the hereinabove cited Belgian patents, during the epoxidation reaction the olefin is epoxidized to form the corresponding oxirane derivative and the organic hydroperoxide is converted to the corresponding alcohol. Desirable reaction conditions include a reaction temperature between about 0° C. and about 200° C., a reaction pressure sufficient to maintain a liquid phase, a molar ratio of olefin to organic hydroperoxide in the reaction between about 1:1 and about 20:1, and reaction times normally between about ten minutes and about ten hours.

SUMMARY OF THE INVENTION

The hereinabove described reaction is highly exothermic (approximately 60,000 calories of heat are liberated per gram mol of epoxide formed in the primary reaction). This heat of reaction is desirably removed from the reactor substantially as fast as it is liberated and it is an advantage of our invention that this highly exothermic heat of reaction is more readily removed. As a consequence, the maintenance of close reaction temperature control is facilitated and the close temperature control achieved by the practice of our invention results in an improvement in process yields.

While the selectivities obtained in the epoxidation process as hereinabove described are high, some of the desired epoxide product formed in the reaction is lost, apparently in part by reaction with the organic hydroperoxide raw material. Without intending to be limited thereby, we believe that this reaction results in the formation of hydroxyalkyl peroxides, i.e., R—O—O—R′—OH wherein R is the organic radical of the organic hydroperoxide and R′ is an organic radical corresponding to the olefin raw material. In a preferred embodiment of our invention side reactions such as that postulated hereinabove are minimized with the resultant advantage of an increase in yield of the desired epoxide product.

In accordance with our invention, we have discovered that temperature control is facilitated, resulting in improved yields, by conducting epoxidation reactions of the type hereinabove described under autogenous pressure and at a reaction temperature sufficient to volatilize a portion of the liquid phase reaction medium. The phrase "autogenous pressure," as used herein, means the bubble point pressure of the liquid reaction medium at the reaction temperature. This volatilized portion of the reaction medium can be condensed and returned to the reactor, i.e., the reactor can be operated at total reflux. Apart from the improved reaction temperature control resulting from operations in accordance with this invention, an ancillary advantage is that the heat of reaction can be removed in many instances by indirect heat exchange in carbon steel equipment rather than alloy steel equipment (such as stainless steel) which would otherwise be required.

However, in a particularly preferred embodiment, a significant portion of the volatilized reaction medium including a portion of the epoxide product is withdrawn from the reactor in the form of a vapor stream. This withdrawn vapor stream is then treated to recover the epoxide product from the other constituents of the vapor stream volatilized together with the epoxide. Materials other than the epoxide product can, if desired, be recycled to the epoxidation reactor. This particularly preferred embodiment of our invention minimizes side reactions of the epoxide and, in combination with the improved temperature control achieved by practice of our invention results in significantly improved overall process yields.

DETAILED DESCRIPTION OF THE INVENTION

The olefinically unsaturated materials which are advantageously employed in the improved epoxidation process of our invention include substituted and unsubstituted aliphatic and alicyclic olefin hydrocarbons. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, methyl cyclohexene, butadiene, styrene, methyl styrene, vinyl toluene, vinylcyclohexene, the phenyl cyclohexenes, and the like. Olefins having halogen, oxygen, sulfur and the like substituents, including ester and ether linkages, can be used. Such substituted olefins are illustrated by allyl alcohol, methallyl alcohol, diallyl ether, methyl methacrylate, methyl oleate, methyl vinyl ketone, allyl chloride, and the like.

Particularly preferred olefins are propylene, n-butane-1, styrene and butadiene. For epoxidation of these preferred olefins, preferred catalysts include molybdenum, titanium, vanadium and tungsten.

Organic hydroperoxides suitable for the practice of our invention have the formula ROOH, wherein R is an organic radical, preferably a substituted or unsubstituted alkyl, cycloalkyl, aralkyl, aralkenyl, hydroxyaralkyl, cycloalkenyl or hydroxycycloalkyl radical said organic radical having from 3-20 carbon atoms. R may also be a heterocyclic radical.

Illustrative and preferred hydroperoxides are cumene hydroperoxide, ethylbenzene hydroperoxide, tertiary butyl hydroperoxide, cyclohexanone peroxide, tetralin hydroperoxide, methyl ethyl ketone peroxide, methylcyclohexene hydroperoxide, and the like, as well as the hydroperoxides of toluene, p-ethyl toluene, isobutyl-benzene, diisopropyl benzene, p-isopropyl toluene, o-xylene, m-xylene, p-xylene, phenyl cyclohexane, etc. Particularly preferred organic hydroperoxides are ethylbenzene hydroperoxide (alpha-phenylethylhydroperoxide) tertiary butyl hydroperoxide, and cyclohexanone peroxide.

On occasion, in the preferred embodiment of our invention wherein a portion of the vaporized reaction medium is withdrawn from the reactor as a vapor, amounts of hydroperoxide, significant in terms of yield, can be present in the withdrawn vapor stream, either because of entrainment or because of an appreciable partial pressure at reaction conditions or both. The presence of appreciable amounts of such hydroperoxide in this withdrawn vapor stream is undesirable and such hydroperoxide is advantageously separated from the vapor stream immediately after its withdrawal from the reactor.

The epoxidation reaction is desirably carried out in the presence of a solvent. Suitable solvents are the aliphatic, naphthenic or aromatic hydrocarbons or their oxygenated derivatives. Preferably, the solvent has the same carbon skeleton as the hydroperoxide used, so as to minimize or avoid solvent separation problems during product recovery. Solvent mixtures may also be employed and, indeed, commonly are employed. Thus, for example, when ethylbenzene hydroperoxide is the epoxidizing agent employed, a particularly preferred solvent would comprise a mixture of ethylbenzene and alpha-phenylethanol.

Reaction temperatures between about 0° C. and about 200° C. can be employed in the process of our invention. In general, we desire to employ reaction temperatures between about 90° C. and about 200° C. and we prefer to employ reaction temperatures between about 90° C. and about 150° C. In each case, and essential to the practice of the present invention, the reaction is conducted under autogenous pressure. Equally essential is that the reactor conditions be chosen to maintain a liquid phase reaction medium, as the epoxidation is a liquid phase reaction. Thus, in the practice of the present invention, the liquid phase reaction medium within the reactor is a boiling liquid. The actual reaction pressure, consequently, will be a function of the nature of the solvent, the nature of the organic hydroperoxide, and the nature of the olefin being epoxidized. In general, the autogenous pressures of the systems employed, i.e., reaction pressures, will be between about atmospheric pressure and about 900 p.s.i.a. In a typical preferred embodiment, wherein propylene oxide is formed by the epoxidation of propylene employing ethylbenzene hydroperoxide as the epoxidant, reaction pressure between about 200 p.s.i.a. and about 700 p.s.i.a. will be encountered, depending upon the concentration of propylene in the reaction medium and upon the reaction temperature selected. Inerts, e.g., ethane, propane or the like if present in the reactor can also affect reaction pressure.

In the preferred embodiment wherein the volatilized reaction medium is withdrawn as a vapor, the reaction temperature and reactor feed composition are desirably such as to permit about one-quarter or more of the epoxide product to be volatilized and preferably are such as to permit one-third or more of such epoxide product to be volatilized. This can readily be accomplished within the temperature ranges specified above. Preferably the feed to the epoxidation reactor in this preferred mode of operation comprises from about 10 to about 80 mol percent of olefin, from about 1 to about 60 mol percent of hydroperoxide, the balance of the feed being primarily solvent. Small amounts of other materials can also be present in the epoxidation reactor feed.

As hereinabove noted, the epoxidation reaction is highly exothermic. Accordingly, the vaporization of the epoxide product and other materials present in the reaction medium effectively consumes a substantial portion, and even in some instances all of the heat of reaction, thereby permitting close control of reactor temperature throughout the epoxidation. Where even higher degrees of vaporization of the reaction medium (including the desired epoxide product) are sought, additional heat can be supplied to the epoxidation reaction in known manner as, for example, by the provision of heating coils within the reactor. Alternatively, where a lesser degree of volatilization of the reaction medium, including the epoxide product, is sought, excess heat of reaction can advantageously be removed in known manner as, for example, by provision of cooling coils within the epoxidation reactor.

The material volatilized during the conduct of the epoxidation reaction accordingly comprises a portion, preferably one-third or more, of the epoxide product, a substantial amount of unreacted olefin, a portion of the solvent employed in the course of the reaction and a portion of the alcohol formed as a result of the utilization of the organic hydroperoxide employed in the reaction (which may be identical with the solvent). When the organic hydroperoxide have high partial pressures in the system, the vapor stream can also contain some organic hydroperoxide. This vapor stream is preferably though not essentially, withdrawn from the reactor and is treated so as to recover unreacted olefin which is advantageously recycled to the epoxidation and also to recover the volatilized epoxide product. This separation can be readily accomplished in known manner as, for example, by distillation techniques. If significant amounts of organic hydroperoxide are present in this vapor stream, we prefer that the hydroperoxide be removed prior to separation and recovery of unreacted olefin and epoxide product since otherwise the comparatively unstable volatilized hydroperoxide might decompose occasioning a loss in yield.

DESCRIPTION OF THE DRAWING

The process of this invention will be more fully explained in conjunction with the attached drawing which is a schematic representation of one preferred embodiment of our invention. For purposes of illustration, but without intending any limitation upon the scope of this invention, the feed to the process as illustrated in the drawing is assumed to be propylene which is converted to propylene oxide employing ethylbenzene hydroperoxide as the epoxidant. The reaction solvent is assumed to be a mixture of ethylbenzene and alpha phenylethanol. The volatilized portion of the reaction medium is assumed to be withdrawn from the reactor, rather than totally refluxed.

Referring to the accompanying drawing, there is provided an epoxidation reactor 10, having inlet conduit 11. Organic hydroperoxide, suitably ethylbenzene hydroperoxide and catalyst, suitably comprising molybdenum e.g., in the form of the naphthenate, are supplied to reactor 10 through conduit 12 which communicates with conduit 11 and thence to reactor 10. A suitable solvent for the reaction, e.g., a mixture of ethylbenzene and alpha phenylethanol, is also supplied to the reactor via conduit 12. Fresh propylene is supplied to reactor 10 via conduit 13, communicating with conduit 11. Recycle propylene, obtained in a manner to be subsequently described is supplied via conduit 36 communicating with conduit 13.

Reactor 10 can be of the tubular type or, more suitably and as depicted in the attached drawing, can be a reaction vessel internally subdivided by baffles 15 into a plurality of compartments 16. Alternatively, one or more of said compartments can be a separate reaction vessel. This compartmentation of the reactor, either by internal baffles or by provision of several reaction vessels connected in series, provides a means for positively preventing undesirable back-mixing of reaction products with the entering reactants.

Disposed within each of the compartments 16 of reactor 10 is a liquid phase reaction medium 17 comprising solvent, unreacted hydroperoxide, unreacted olefin, epoxide product, and organic alcohol formed during the reaction of the hydroperoxide with the olefin. (In many instances the organic alcohol formed by the reaction of the hydroperoxide with the olefin is identical with the solvent.)

In accordance with this invention, the liquid phase reaction medium is maintained under its autogenous pressure and therefore is partially vaporized as the reaction proceeds, i.e., the reaction is boiling. The heat requirements for this vaporization are supplied by the heat of reaction. This vaporized portion of the reaction medium in the embodiment depicted in the drawing is withdrawn from reactor 10 via conduit 18 and is fed to zone 30.

In the operation of reactor 10 the reactants enter compartment 16a and accumulate therein until the level of the liquid phase reaction medium within compartment 16a exceeds the height of internal baffle (or weir) 15a. The liquid phase reaction medium then overflows baffle 15a and flows into compartment 16b. In like manner the liquid phase reaction medium successively passes into compartments 16c, 16d, and 16e, ultimately exiting from reactor 10 via conduit 19. The liquid reactor effluent is then fed via conduit 19 to fractionation zone 30. If desired, the recycle propylene can be distributed into some or all compartments of the reactor via lines 40a, 40b, 40c, 40d and 40e so as to maintain a constant concentration of propylene within each compartment by replacing that portion which is volatilized.

The vaporized reaction medium flows to fractionating zone 30. In fractionating zone 30 this vaporized medium and the liquid phase epoxidation reactor effluent, which is drawn from reactor 10 via conduit 19, are processed to recover unreacted propylene and a mixture comprising the propylene oxide product, ethylbenzene and alpha phenylethanol solvent, and alpha phenylethanol formed as the result of the reaction of ethylbenzene hydroperoxide with propylene. Fractionating zone 30 is preferably designed and operated to maintain the bottoms temperatures therein at sufficiently low levels to minimize decomposition of propylene oxide, i.e., below 160° C. and preferably at or below 130° C. The propylene so recovered is withdrawn from fractionating zone 30 via conduit 36 and is recycled to the epoxidation reaction. The product mixture is withdrawn from fractionating zone 30 via conduit 37. Facilities can be provided within fractionating zone 30 for separating and purging inerts from the system to prevent their build-up.

Accordingly, fractionating zone 30 functions as a depropanization system. Since the design of such equipment is conventional and since the design and operation of such equipment associated with fractionating zone 30 is not shown in the attached drawing.

Fractionating zone 30 can often consist of two or more columns connected in series together with the associated heat exchangers, pumps and the like. In such a system, the pressure in the first of the columns is sufficiently high to permit condensation of the overhead propylene with cooling water while the bottoms also contains sufficient propylene (plus, of course, propylene oxide, ethylbenzene and alpha phenylethanol) to allow the bottoms temperature to remain within the hereinabove described limits. Such a column typically contains 12 theoretical vapor-liquid contacting stages and operates with a reflux ratio (mols of reflux per mol of net liquid overhead product) of 0.8:1. Suitable overhead temperatures and pressures are respectively 55° C. and 355 p.s.i.a. while the suitable bottoms temperatures and pressures are respectively 130° C. and 360 p.s.i.a.

The second column desirably operates at a lower pressure and is used to remove the balance of the propylene from the propylene oxide-ethylbenzene-alpha phenylethanol. Suitable operating characteristics for this second column would include an overhead temperature and pressure of respectively −25° C. and 32 p.s.i.a. and a bottoms temperature and pressure respectively of 130° C. and 37 p.s.i.a. Such a column suitably contains 15 theoretical vapor-liquid contacting stages and operates with 0.6 mols of liquid reflux per mol of feed entering the column. Because of the low overhead temperature, the second column requires vapor compression and/or refrigeration facilities to permit condensation of propylene. The bottoms from the second column in such a system is an essentially propylene-free mixture comprising propylene oxide, ethylbenzene, and alpha phenylethanol.

EXAMPLE

The following example is presented to further illustrate this invention but is not intended as limiting the scope thereof. Unless otherwise stated, all parts and percents in this example are expressed on a molar basis.

Example 1

A continuous epoxidation experiment is conducted in apparatus similar to that schematically depicted in FIG. 1. Insofar as is necessary for an understanding of the invention, details of the apparatus will be described in conjunction with the following description of the epoxidation.

Ethylbenzene hydroperoxide plus ethylbenzene and alpha phenyl ethanol solvent are fed to a reaction vessel at the rate of 5.86 parts per hour. Also present in this stream is molybdenum catalyst sufficient to provide 75 p.p.m. (by weight) of molybdenum in the total reactor feed. Composition of this stream is given in the first column of Table I. Also fed to this reactor are 15.81 parts per hour of propylene, of which 0.79 parts per hour are fresh propylene and 15.02 parts per hour are recycled propylene. The recycle propylene is distributed between the various compartments in order to maintain the temperature constant. For the sake of completeness in Table I, these stream compositions are included in the second and third columns thereof.

The reactor in which the epoxidation reaction occurs is divided by internal baffles into five compartments so sized that the total residence time of the liquid phase reaction medium within all compartments is about 11 minutes. The baffles are so arranged that the liquid phase reaction medium flows sequentially from compartment to compartment and is withdrawn after the fifth compartment of the reactor. Vapor space is also provided within each compartment and the vapor spaces of each compartment are not isolated from one another, i.e., they are interconnected.

The epoxidation reactor is maintained at a temperature of 132° C. and is maintained under autogenous pressure of the system—in this case 375 p.s.i.a.

During the course of the reaction 11.21 parts per hour of the liquid phase reaction medium are vaporized and are withdrawn from the reactor as a vapor. The composition of this vapor is given in the fourth column of Table I. Also, 10.46 parts per hour of liquid phase reaction medium having the composition set forth in the fifth column of Table I are withdrawn from the reactor.

The net vapors from the reactor are fractionated to recover unreacted propylene for recycle and propylene oxide product in admixture with alpha phenyl ethanol and ethylbenzene as the product. This is accomplished in conventional distillation equipment indicated as column 30. Also processed in this distillation equipment is the liquid phase reaction medium withdrawn from the reactor as hereinabove described. The recycle propylene amounts to 15.02 parts per hour and has the composition set forth in the sixth column of Table I. The bottoms product from this distillation amounts to 6.65 parts per hour and has the composition listed in the seventh column of Table I. During this distillation, the bottoms temperature is controlled so that it does not exceed about 130° C. The bottoms product from this distillation can then be processed in known manner so as to recover propylene oxide in high purity in subsequent equipment e.g., distillation equipment, in known manner.

It will be noted that the selectivity to propylene oxide based on total hydroperoxide converted in the reactor in this example is 75 mol percent. In contrast, in a control experiment wherein the reactor pressure was maintained at a level above the autogenous pressure of the system, i.e., wherein no vaporization of the reaction medium takes place, a significantly lower selectivity is obtained.

The foregoing description illustrates the methods of this invention whereby the advantages thereof are obtained. It will be understood that modifications and variations thereof may be effected by those skilled in the art without departing from the spirit of our invention. For example, in a multi zoned reactor the temperature can be the same in each zone or the temperature can vary from zone to zone. It is sometimes desirable to have somewhat higher temperatures in the last zones to insure more complete reaction at the lower reactant concentrations. Also each zone should have adequate agitation. Suitable agitation can be achieved by the boiling effect, by mechanical agitations, by appropriate sparging of materials fed to the zones, by pump around procedures or by combinations thereof. Accordingly, it is intended that all matter contained in the above description shall be interpreted as illustrative and not in a limiting sense.

that the total residence time of the liquid phase reaction medium within all compartments is 32 minutes based on the flow of liquid leaving the reactor in line 19. The baffles are so arranged that the liquid phase reaction medium flows sequentially from compartment to compartment and is withdrawn after the fifth compartment of the reactor.

During the course of the reaction 28.3 parts per hour by weight of liquid phase reaction medium are vaporized and are withdrawn from the reactor as a vapor through line 18. This vapor stream contains 0.64 parts per hour of propylene oxide by weight. Also, 12.3 parts per hour by weight of liquid phase reaction medium are withdrawn from the reactor through line 19. This stream contains 1.10 parts per hour of propylene oxide by weight.

Analyses of streams 18 and 19 show that 83% of the t-butyl hydroperoxide fed to the reactor has been converted. The resulting selectivity of propylene oxide based on total hydroperoxide converted in the reactor is 88 mol percent.

Example 3 (Comparative)

The experiment of Example 2 is repeated but under conditions where no net propylene oxide is removed from the reactor in the vapor boilup streams.

The reactor differs from the arrangement in FIG. 1 in that the vapor boilup from each of the 5 compartments is separately condensed and returned to the compartment from which the vapor evolved. Thus each of the 5 compartments are provided with a separate condenser. Baffles are provided to separate the vapor spaces between compartments, and overflow devices are provided to permit liquid flow from compartment to compartment in series. No net vapors are removed from the reactor. The feed is 10 parts per hour by weight of a 37 weight percent t-butyl hydroperoxide solution containing 300 p.p.m. by weight of molybdenum catalyst. This is the same feed as used in Example 2. The total feed rate of fresh plus recycle propylene from lines 13 and 36 is 6.6 parts per hour by weight. This propylene feed is distributed among the 5 compartments to maintain a temperature of 121° C. and a pressure of 600 p.s.i.a. in each compartment. The

TABLE I.—STREAM COMPOSITIONS FOR EXAMPLE I

[Mol percent]

| Component | (1) Epoxidant solvent a | (2) Fresh olefin b | (3) Recycle olefin b | (4) Withdrawn vapor | (5) Liquid effluent | (6) Recycle propylene b | (7) Product mixture a |
|---|---|---|---|---|---|---|---|
| Propylene | | 100.0 | 100.0 | 96.1 | 40.61 | 100.0 | |
| Propylene oxide | | | | 2.70 | 3.89 | | 10.71 |
| Alpha phenyl ethanol | 3.1 | | | (d) | 8.53 | | 13.42 |
| Ethyl benzene | 79.8 | | | 1.20 | 43.46 | | 70.35 |
| Ethyl benzene hydroperoxide | 17.1 | | | (e) | 0.48 | | 0.75 |
| Heavies c | | | | | 3.03 | | 4.77 |
| Total | 100.0 | 100.0 | 100.0 | 100.0 | 100.0 | 100.0 | 100.0 | a Excludes catalyst.
b Excludes inerts, e.g., propane, ethane, nitrogen, carbon dioxide, etc.
c High-boiling reaction by-products.
d 75 p.p.m., molar.
e 5 p.p.m., molar.

Example 2

A continuous epoxidation experiment is conducted in apparatus similar to that schematically depicted in FIG. 1 of the original disclosure.

T-butyl hydroperoxide plus t-butyl alcohol solvent are fed to a reaction vessel at the rate of 10.0 parts per hour by weight. This stream contains 37 weight percent t-butyl hydroperoxide and also contains 300 p.p.m. by weight of molybdenum catalyst. Also fed to this reactor are 30.6 parts per hour by weight of fresh plus recycled propylene through lines 36 and 13. The pressure in the reactor is maintained at 600 p.s.i.a. by removal of vapor through line 18. The propylene feed is distributed among the various compartments so that a temperature of 121° C. is maintained in each compartment.

The reactor in which the epoxidation reaction occurs is divided by internal baffles into 5 compartments so sized compartments are sized to give a residence time of 32 minutes based on flow of exit liquid through line 19.

16.6 parts per hour by weight of liquid phase reaction medium are withdrawn from the fifth compartment of the reactor. This is the only net process steam removed from the reactor. Analysis of this liquid effluent stream shows that it contains 1.63 parts per hour by weight of propylene oxide, and that 83% of the t-butyl hydroperoxide feed has been converted. The selectivity to propylene oxide based on total hydroperoxide converted is 82.5 mol percent.

The superior propylene oxide selectivity obtained in Example 2 as compared with Example 3 is believed to be the result of propylene oxide removal from the reaction liquid in the exit vapor stream, thereby preventing the partial degradation of propylene oxide through reaction with t-butyl hydroperoxide and with other trace constituents such as acids and water. It should be noted that the concentrations of propylene, molybdenum, and t-butyl hydroperoxide in the liquid reaction medium are essentially the same in Example 3 as in Example 2.

What is claimed is:

1. In the continuous process for the preparation of propylene oxide by the reaction between propylene and an organic hydroperoxide in the presence of a liquid phase reaction medium and in the presence of a catalyst selected from at least one member of the group consisting of titanium, vanadium, chromium, columbium, selenium, zirconium, molybdenum, tellurium, tantalum, tungsten, rhenium and uranium; the improvement which comprises, continuously conducting the reaction in a reactor at a temperature within the range between about 90° C. and about 200° C. and at the autogenous pressure of the liquid phase reaction medium so that said medium is a boiling liquid, the reactor feed comprising 10 to 80 mol percent propylene and 1 to 60 mol percent hydroperoxide, continuously volatilizing a portion of the liquid phase reaction medium during the conduct of the reaction, as a result of said boiling, said volatilized portion containing at least one-fourth of the propylene oxide formed in the reaction, withdrawing the propylene oxide containing vaporized reaction medium from the reactor as a vapor, continuously withdrawing the unvaporized reaction medium containing the balance of the propylene oxide product from the reactor as a liquid, continuously separating propylene oxide from said withdrawn vaporized reaction medium by fractional distillation at temperatures not to exceed 160° C. and continuously recycling propylene in said withdrawn vaporized reaction medium to the epoxidation reaction as part of the said feed thereto.

2. A process in accordance with claim 1 wherein the organic hydroperoxide is ethylbenzene hydroperoxide.

3. A process in accordance with claim 1 wherein the reaction temperature is between 90° C. and about 150° C.

References Cited
UNITED STATES PATENTS

| | | | |
|---|---|---|---|
| 3,351,635 | 11/1967 | Kollar | 260—348.5 |
| 3,526,645 | 9/1970 | Vangermain et al. | 260—348.5 |
| 2,644,837 | 7/1953 | Schweitzer | 260—484 |
| 1,916,473 | 7/1933 | Forrest et al. | |

FOREIGN PATENTS

| | | | |
|---|---|---|---|
| 1,421,285 | 11/1965 | France | 260—348.5 |

NORMA S. MILESTONE, Primary Examiner